(12) United States Patent
Stefano et al.

(10) Patent No.: US 6,446,876 B1
(45) Date of Patent: Sep. 10, 2002

(54) APPARATUS WITH INTEGRATED SHAPE MEMORY ACTUATOR FOR REGULATING THE FLOW OF AIR IN A CONDUIT, PARTICULARLY FOR AIR-CONDITIONING SYSTEMS IN MOTOR VEHICLES

(75) Inventors: Alacqua Stefano; Butera Francesco, both of Turin (IT)

(73) Assignee: CRF Societa Consortile per Azioni, Turin (IT)

( * ) Notice: Subject to any disclaimer, the term of this patent is extended or adjusted under 35 U.S.C. 154(b) by 0 days.

(21) Appl. No.: 09/970,931

(22) Filed: Oct. 5, 2001

(30) Foreign Application Priority Data

Oct. 6, 2000 (IT) .......................................... TO00A0930

(51) Int. Cl.$^7$ ............................. F24F 11/00; F24F 13/06
(52) U.S. Cl. ...................... 236/49.3; 454/258; 236/68 R
(58) Field of Search ............................... 236/49.3, 68 R, 236/68 C; 251/11; 454/258, 318

(56) References Cited

U.S. PATENT DOCUMENTS

| | | | |
|---|---|---|---|
| 3,050,601 A | 8/1962 | Bohn | 236/1 C |
| 3,257,931 A | 6/1966 | Lupton | 236/68 C |
| 3,967,779 A | 7/1976 | Logsdon | 137/601.01 |
| 3,976,244 A | 8/1976 | Logsdon | 236/49.5 |
| 6,247,678 B1 | 6/2001 | Hines et al. | 251/11 |
| 6,279,869 B1 | 8/2001 | Olewicz | 251/11 |

Primary Examiner—William E. Tapolcai
(74) Attorney, Agent, or Firm—Sughrue Mion, PLLC

(57) ABSTRACT

Apparatus comprising a plurality of Venetian blind slats controlled by an actuator rod associated to one side of a frame supporting the pivoting slats. The actuator rod is controlled by a metallic alloy shape memory wire associated to said rod, which is powered by electrical current causing the wire to heat and shorten thus moving the actuator rod against the action of a return spring. The actuator system is completely integrated in the structure of the apparatus. The position of the actuator rod is signalled by a sensor, preferably a potentiometer, comprising a slider connected to the actuator rod, co-operating with an electrical track connected to the frame of the apparatus.

5 Claims, 5 Drawing Sheets

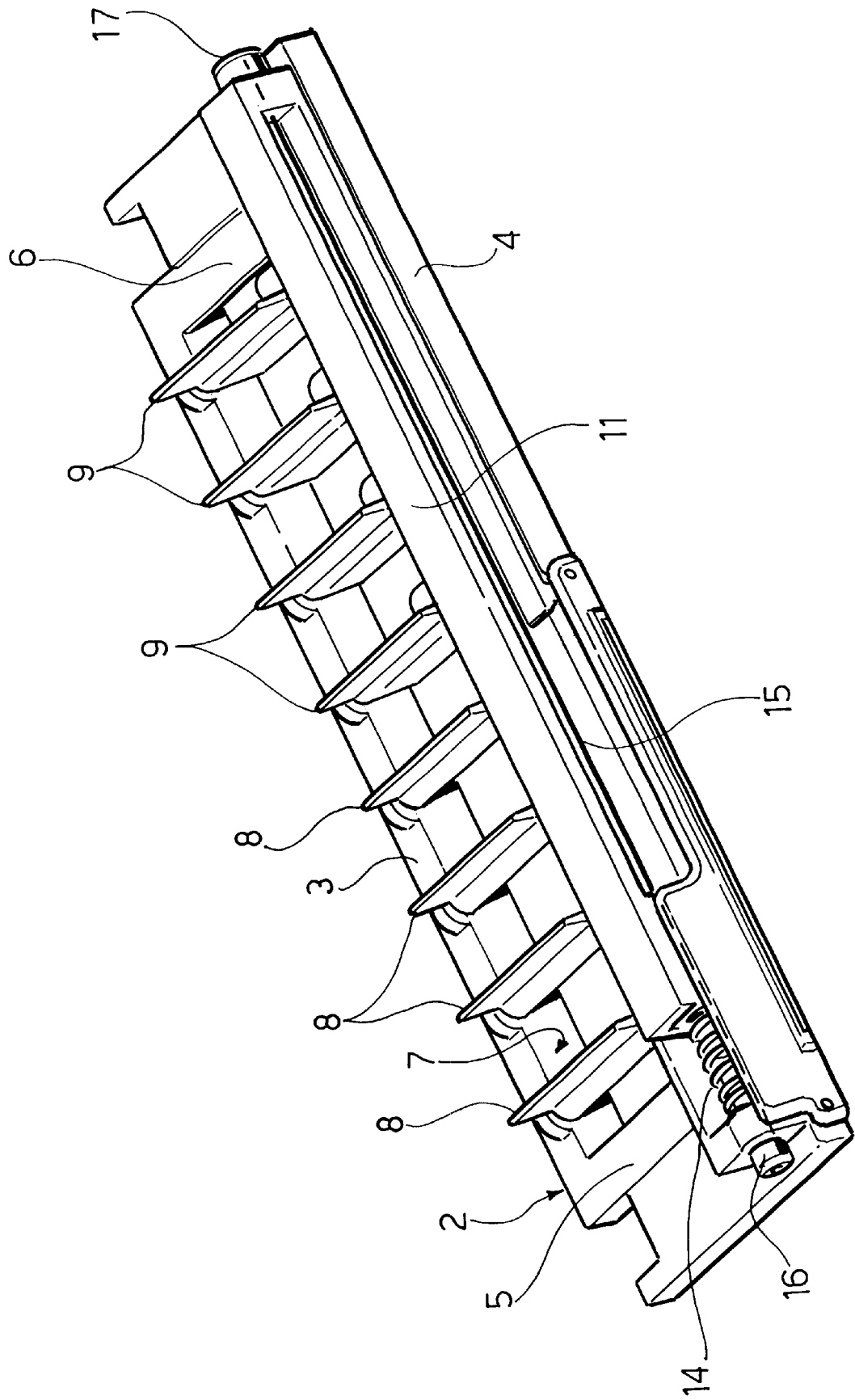

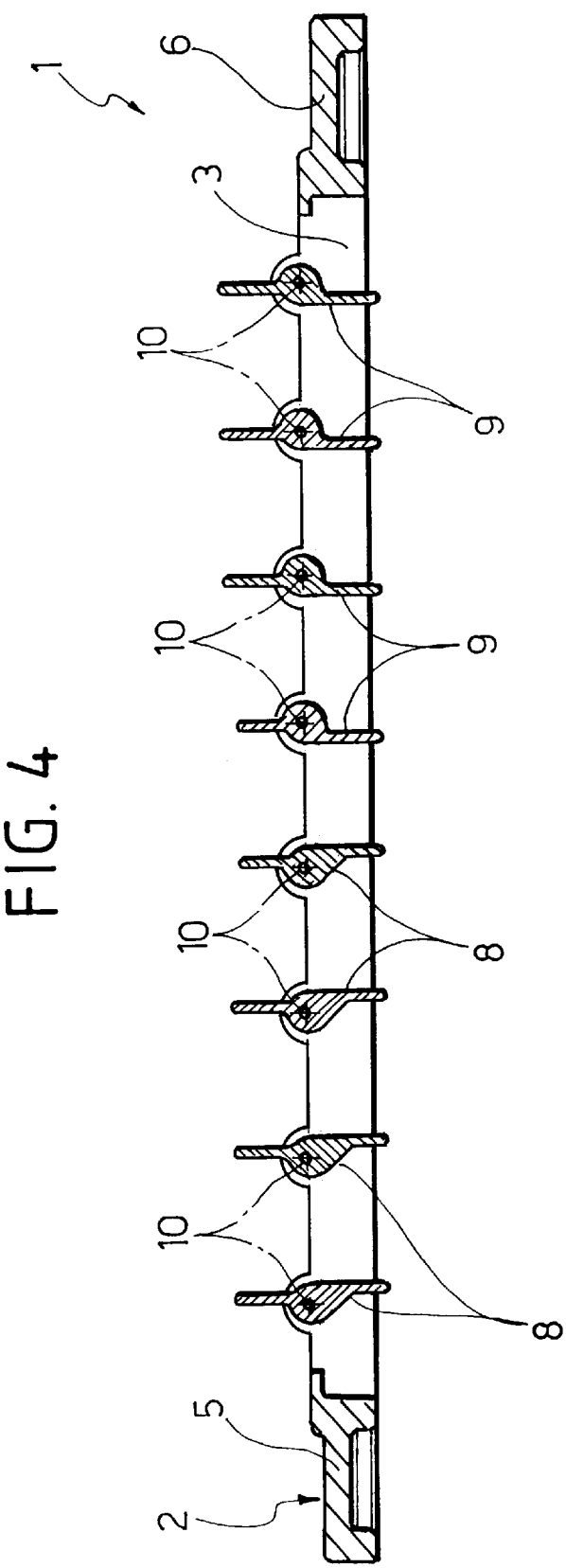
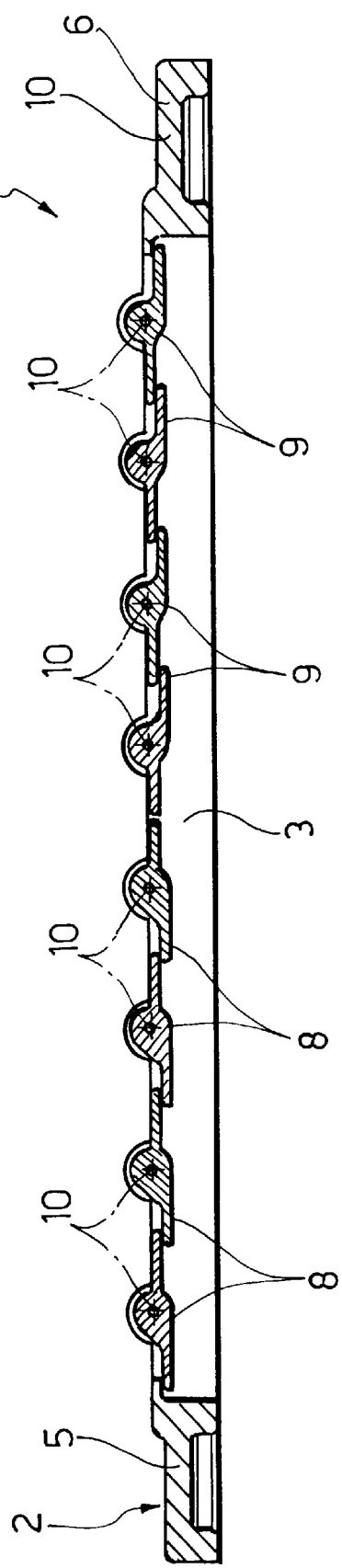

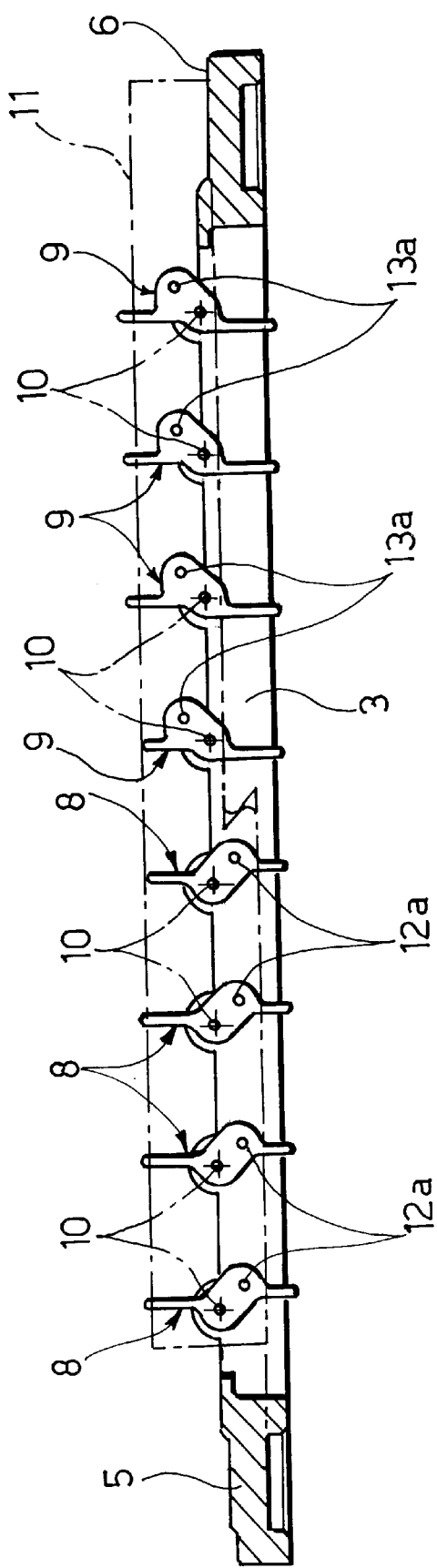
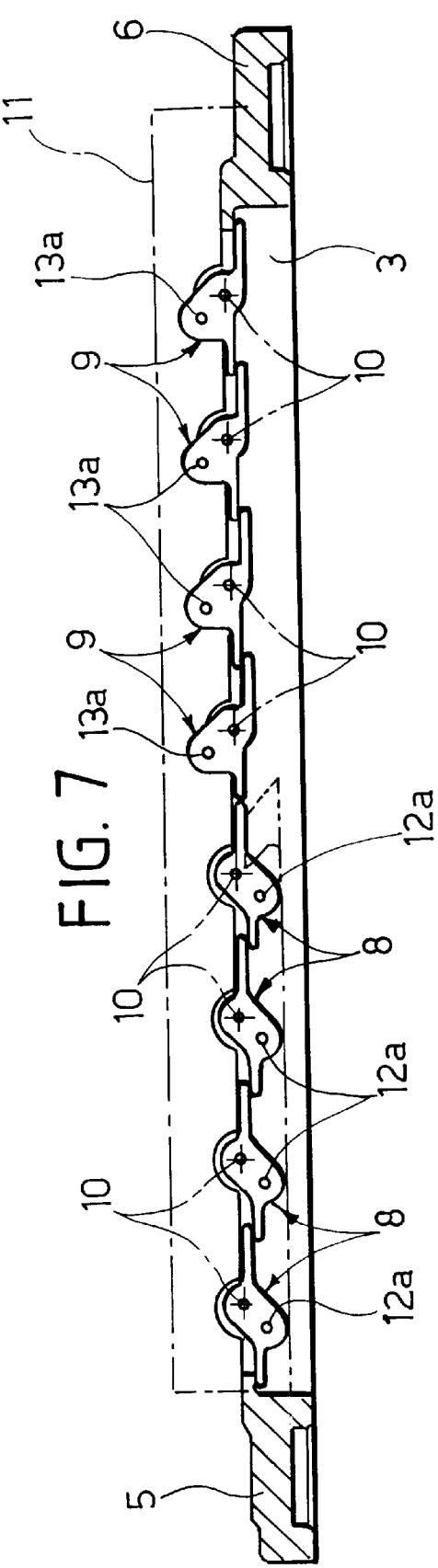

APPARATUS WITH INTEGRATED SHAPE MEMORY ACTUATOR FOR REGULATING THE FLOW OF AIR IN A CONDUIT, PARTICULARLY FOR AIR-CONDITIONING SYSTEMS IN MOTOR VEHICLES

BACKGROUND OF THE INVENTION

This invention relates to apparatuses for regulating the flow of air in a conduit, particularly for air-conditioning systems in motor vehicles.

The Applicant has previously proposed a apparatus of this kind in European Patent Application EP-A 0 895 885 comprising a support structure forming a passage section of a flow of air, flap means pivotally mounted on said support structure between a closed position and an open position, elastic means for recalling the flap means towards one of two said positions and shape memory actuators to control a movement of said flap means towards the other of said positions.

The use of actuators made of shape memory metallic alloys, typically nickel and titanium, is known and described in technical literature. These means are deformed when a certain predetermined transition temperature is reached, in the order of 100° C., for example. In the aforesaid solution, the shape memory actuator consists of a torsion bar connected to a baffle flap, which is activated by the passage of electrical current.

SUMMARY OF THE INVENTION

The objective of this invention is to attain a apparatus of the type illustrated above, which structure is extremely simple and compact and which is efficient, in which the shape memory actuator is integrated in the structure of the apparatus.

In order to attain this result, this invention relates to a apparatus, which characteristics are described at the beginning of this description, and which is characterised in that it comprises a frame comprising two longer, parallel distanced sides and two end sides, which connect the two longer sides, so to create a window for the passage of air, in that said flap comprises a plurality of Venetian blind slats pivotally mounted between the two opposite sides of the frame, which are also connected to a mobile actuator rod along one of said sides, in that said elastic means are arranged between said actuator rod and said frame, and in that said shape memory actuator means comprise:

- at least one wire made of metallic shape memory alloy, arranged in parallel to said actuator rod and having one end connected to the rod and the other end connected to the frame, the actuator rod and wire assembly being consequently substantially integrated in the structure of the frame,
- means for supplying electrical current to the wire, so to heat it and shorten it by shape memory effect,
- actuator rod position sensor and electronic control means for controlling the electrical power means, according to an external control signal of the apparatus and according to the output signal of said sensors.

Thanks to these characteristics, the apparatus according to this invention presents and extremely simple and compact structure, with the shape memory actuator completely integrated in the structure of the apparatus.

A typical application of the apparatus according to the invention is for regulating the passage of air through a conduit in a air-conditioning or ventilation system of a motor vehicle. In home position, the apparatus is held in one of its two extreme positions (which can be either the all-open position or the all-closed position) by the elastic means recalling the actuator rod. In operative position, the apparatus is located in a position which is determined by the control set by the driver by means of a corresponding control apparatus arranged on the dashboard of the motor vehicle. When said control apparatus is operated, the electronic control unit supplies electrical power to the shape memory wire, which heats up and shortens, causing the actuator rod to move in the direction of the position opposite to the home position. The sensor means of the actuator rod signal this position to the electronic control unit, which is thus capable of controlling the supply of electrical power to the shape memory wire so to keep the pivoting slats in the position corresponding to the control operated by the user.

In a preferred form of embodiment, said sensor means consists of a potentiometer, comprising an electrical track, connected to the frame of the apparatus, and a slider, which co-operates with the electrical track and is connected to the actuator rod. Preferably, two sets of pivoting slats are to be arranged and connected to the actuator rod so to turn simultaneously in opposite directions following the movement of the actuator rod. This structure is preferable to attain a uniform, symmetric flow of air through the conduit in which the apparatus according to this invention is mounted.

BRIEF DESCRIPTION OF THE DRAWINGS

Thanks to the complete integration of the shape memory actuator in the structure of the apparatus, the latter presents an extremely small size and a simple, low-cost structure, which make the use of the apparatus according to this invention possible in a wide array of different applications, for example in a hot and cold air mixing chamber in a motor vehicle air-conditioning system and in ventilation vents mounted on the dashboard of a motor vehicle.

This invention will be better explained by the following detailed descriptions with reference to the accompanying figure as non-limiting example, whereas:

FIG. 1 is a perspective view of a preferred form of embodiment of the apparatus according to this invention, FIGS. 4 and 5 are sections according to line IV—IV in FIG. 2 in two different operating conditions of the apparatus, FIGS. 6 and 7 are sections according to line VI—VI of FIG. 2 in said two operating conditions.

DETAILED DESCRIPTION OF THE INVENTION

Figure 3:
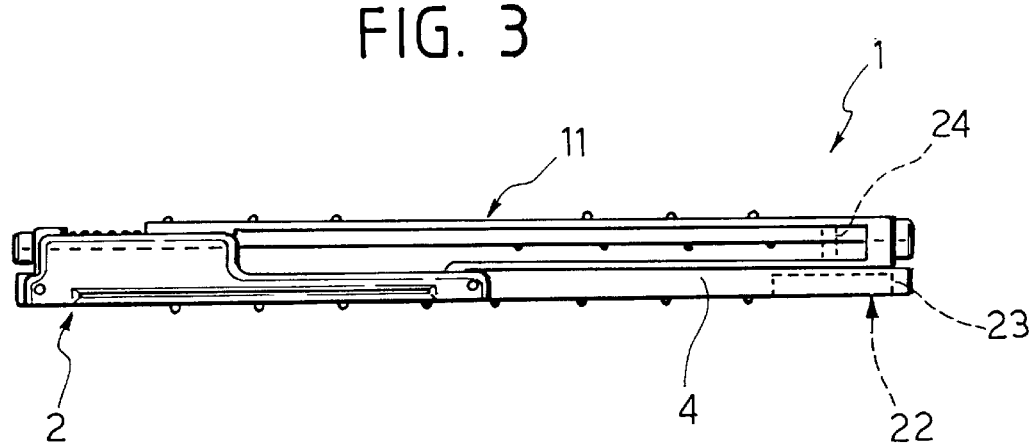
FIG. 3 is a lateral view.

With reference to the figures, numeral 1 generally indicates a apparatus for controlling the flow of air through a conduit comprising a frame 2 with two longer sides 3, 4, which are parallel and distanced, and two end sides 5, 6, which connect the longer sides 3, 4. The frame 2 forms a window 7 for the passage of a flow of air, which is controlled by a plurality of Venetian blind slats 8, 9, pivotally mounted between the two longer sides 3, 4 of the frame 2 around axes 10 (see FIGS. 4, 5), all arranged on a common plane. The slats 8, 9 are also connected to an actuator rod 11, which is slidingly mounted over the longer side 4 of the frame between two extreme positions corresponding to the all-closed position and to the all-open position of the window 7.

Figure 2:
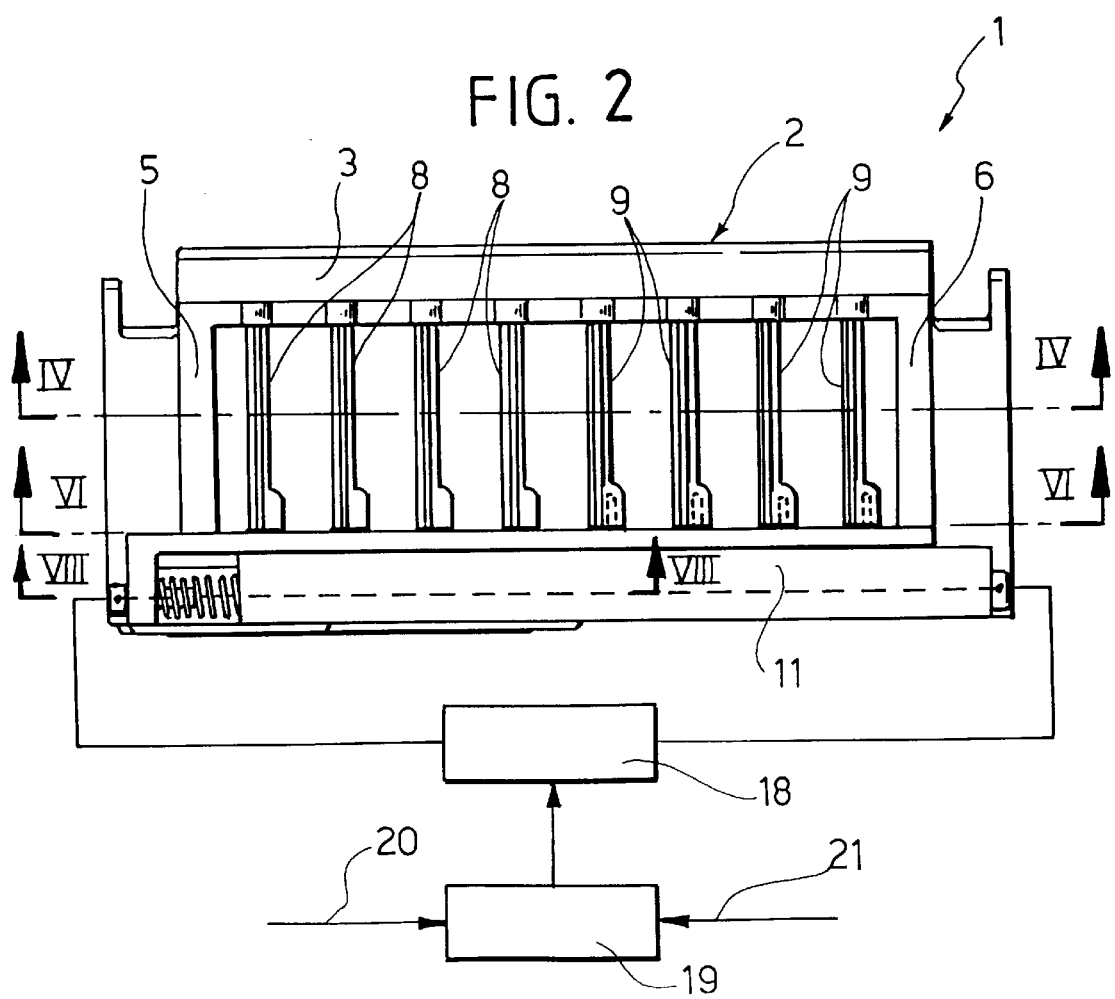
FIG. 2 is a plan view.
Figure 8:
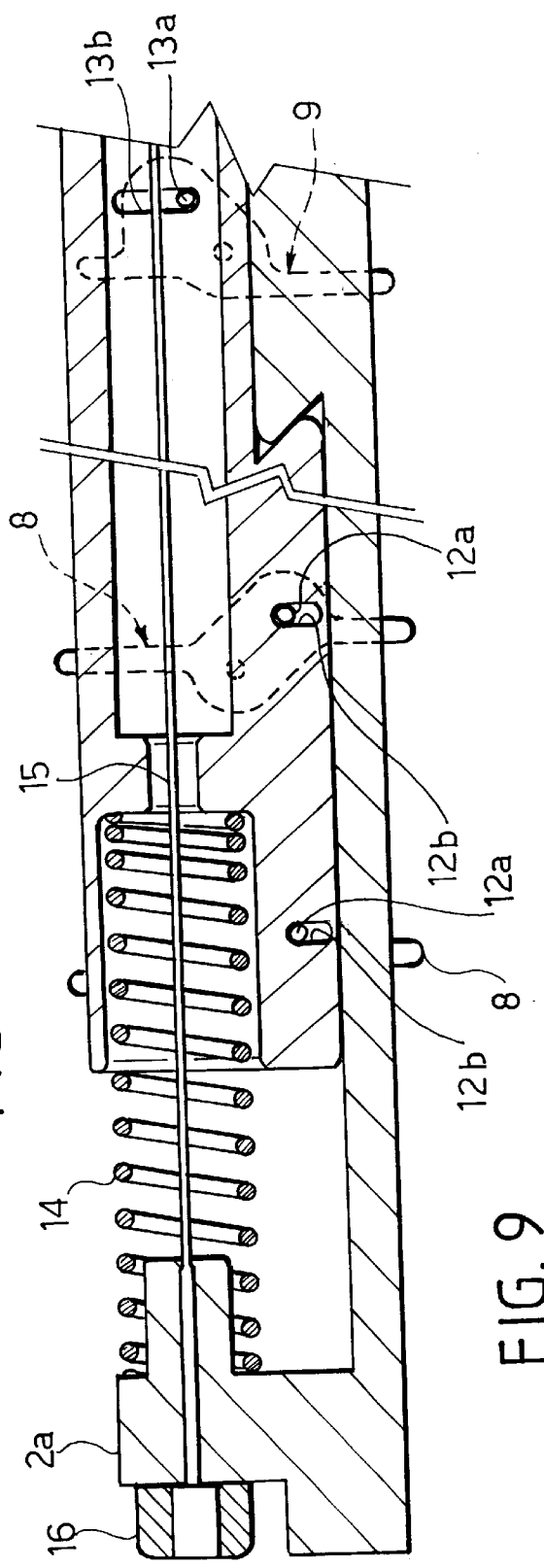
FIGS. 8 and 9 illustrate a section view according to line VIII—VIII in FIG. 2 of said two operating conditions.
Figure 9:
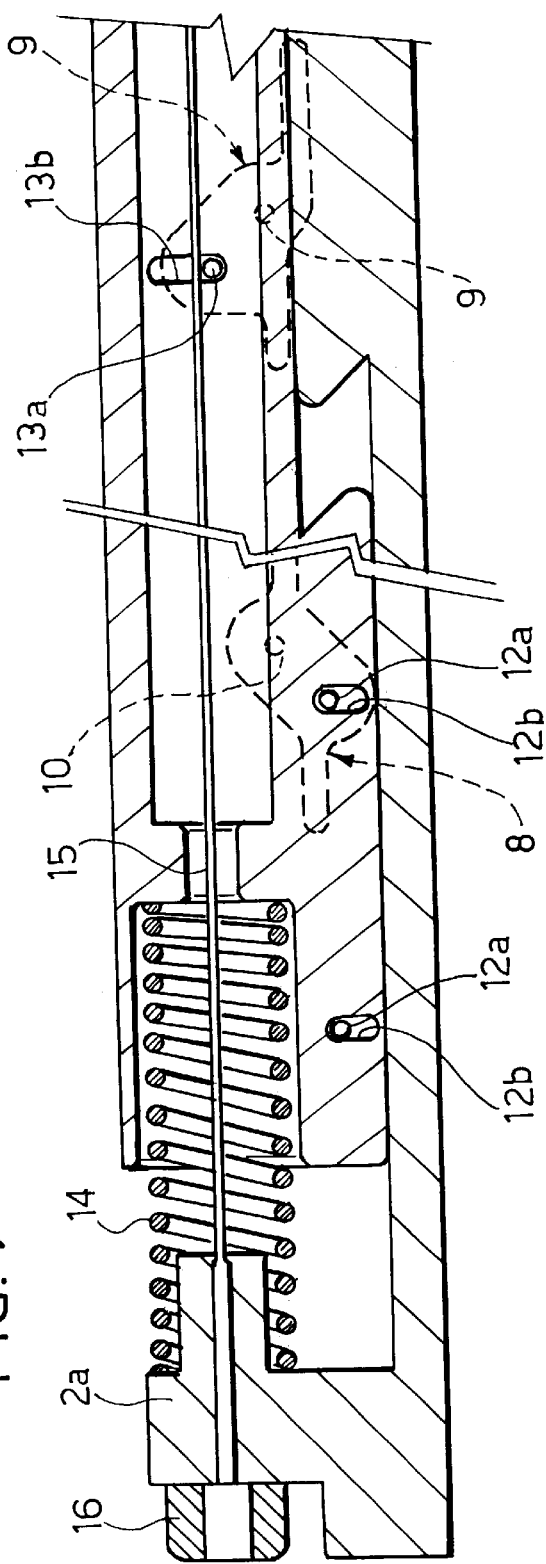

The slats 8 are connected to the actuator rod 11 by engaging respective offset pins 12a in slots 12b on the rod 11 (see FIGS. 6–9). On the other hand, the slats 9 are connected to the actuator rod 11 by engaging offset pins 13a in slots 13b of the rod 11. The connection is arranged so that a longitudinal movement of the actuator rod 11 causes the simultaneous rotation in opposite directions of the two groups of slats 8, 9 between the all-closed position and the all-open position of the window (see FIGS. 6, 7). The actuator rod 11 is pushed by a coil spring 14, arranged between one end of the rod 11 and one tab 2a of the frame 2, towards a home position, corresponding all-open condition of the window. The movement of the actuator rod 11 towards the all-closed condition of the window is obtained by means of a wire 15, consisting of a shape memory metallic alloy, which extends for the entire length of the spring 14 and the actuator rod 11, one end of which is fastened to the tab 2a and one end 17 is fastened to the actuator rod 11. Reference numeral 18 in FIG. 2 indicates means of any known type for supplying electrical current through the shape memory wire 15. The power means 18 are controlled by an electronic control unit 19, on the basis of a control signal 20, deriving from the operation of a control apparatus by the user (for example, a lever or a knob) arranged on the dashboard of the motor vehicle, also according to a signal 21 output by a sensor 22 of the actuator rod position. In the example shown, the sensor 22 consists of a potentiometer, comprising a base 23 fastened to the frame 2 and carrying an electrical track, and a slider 24 connected to the actuator rod 11 and co-operating on track 23.

In operation, the control apparatus arranged on the dashboard of the motor vehicle causes a control signal 20 to be sent to the electronic control unit 19 which thus works on the power means 18 to supply an electrical current through the wire 11. The wire heating deriving from the passage of electrical current exceeds the transition threshold of the wire and consequently makes the wire shorten. Consequently, the actuator rod 11 moves leftwards, with reference to the figures, against the action of the spring 14, causing the rotation of the pivoting slats 8, 9 in the all-closed position direction of the window. The position of the actuator rod is detected by the sensor 22, which sends a consequent signal 21 to the electronic control unit 19. The control unit 19 controls the power means 19 according to the signals 20, 21 to keep the slats 8, 9 in the position corresponding to the command. When the system is not working, the spring 14 returns the actuator rod 11 in the home position, corresponding to the all-open condition of the window as the shape memory wire 15 cools.

In a preferred form of embodiment, said electronic control means 19 activate the electrical power means 18 for a prolonged time, to reach the required position of the actuator rod 11 and to keep this actuator rod 11 in the required position by a prolonged pulse operation of the electrical power means 19, for the time which the control signal 20 persists.

As appears in the description above, the apparatus according to this invention is characterised by an extremely simple, compact structure. The shape memory actuator is entirely integrated in the frame, which facilitates assembly of the apparatus, also in areas where the available space is low.

Naturally, numerous changes can be implemented to the construction and forms of embodiment of the invention herein envisaged, all comprised within the context of the concept characterising this invention, as defined by the following claims.

What is claimed is:

1. Apparatus for regulating the flow of air in a conduit, comprising:

a support structure forming a passage section for the flow of air, slat means pivotally mounted on said support structure between a closed position and an open position, elastic means for recalling the slat means towards one of said two positions, shape memory actuators for controlling the movement of said slat means towards one of said positions, wherein said support structure consists of a frame comprising two longer sides, which are parallel and distanced, and two end sides, which connect the two longer sides so to form a window for the passage of air, wherein said flap means comprise a plurality of Venetian blind slats pivotally mounted between the two opposite sides of the frame, which are also connected to a mobile actuator rod along one of said sides, wherein said elastic means are arranged between said actuator rod and said frame, and wherein said shape memory actuator means comprise:

at least one wire made of metallic shape memory alloy, arranged along said actuator rod and having one end connected to the rod and the other end connected to the frame, the actuator rod and wire assembly being substantially integrated in the structure of the frame, means for supplying electrical current to the wire, so to heat it and shorten it by shape memory effect, sensors of the position of the actuator rod, and electronic control means for controlling the electrical power means, according to an external control signal of the apparatus and according to the output signal of said sensors.

2. Apparatus according to claim 1, wherein the sensor means consist of a potentiometer comprising an electrical track connected to the frame and a slider connected to the actuator rod.

3. Apparatus according to claim 1, wherein the slats are pivotally mounted on the two longer sides of the frame.

4. Apparatus according to claim 1, wherein two sets of pivoting slats are connected to the actuator rod so to turn simultaneously in opposite directions following a movement of the actuator rod.

5. Apparatus according to claim 1, wherein said electronic control means are capable of activating the electrical power means for a prolonged time, to reach the required position of the actuator rod and to hold said actuator rod in the required position by a prolonged activation of the electrical power means for all the time in which the control signal persists.

* * * * *